United States Patent [19]
Banks et al.

[11] Patent Number: 5,289,615
[45] Date of Patent: Mar. 1, 1994

[54] AIRCRAFT DOOR HINGE MECHANISM

[75] Inventors: Eddie D. Banks, Renton; Tomio Hamatani, Seattle, both of Wash.; Hajime Kishi, Kagamihara, Japan; Richard B. Odell, Kirkland, Takayoshi Urasawa, Bellvue, both of Wash.

[73] Assignee: The Boeing Company, Seattle, Wash.

[21] Appl. No.: 791,663

[22] Filed: Nov. 8, 1991

[51] Int. Cl.⁵ .................. E05D 3/06; E05D 15/28; B64C 1/14
[52] U.S. Cl. ...................... 16/366; 244/905; 244/129.5; 49/246
[58] Field of Search ............ 16/366; 244/129.5, 129.4; 49/246

[56] References Cited

U.S. PATENT DOCUMENTS

| | | | |
|---|---|---|---|
| 2,702,400 | 2/1955 | Marple | 16/371 |
| 3,004,303 | 10/1961 | Wilmer | 244/129.5 |
| 3,016,261 | 1/1962 | Tatter | 49/246 |
| 4,025,104 | 5/1977 | Grossbach et al. | |
| 4,607,812 | 8/1986 | De Haan et al. | |
| 4,720,065 | 1/1988 | Hamatani | 244/905 |

FOREIGN PATENT DOCUMENTS 505691 8/1930 Fed. Rep. of Germany.

Primary Examiner—David Jones
Assistant Examiner—Carmine Cuda
Attorney, Agent, or Firm—Christensen, O'Connor, Johnson & Kindness

[57] ABSTRACT

A hinge assembly (14) for attaching a translating-motion-type aircraft door (10) to an aircraft fuselage (12) is disclosed. The hinge assembly (14) includes a fitting (28) that is pivotally attached to the portion of the aircraft fuselage (14) adjacent the door opening (16) in the fuselage in which the door (10) is normally seated. The door is attached to the hinge fitting (28) by way of a universal shaft (30) that is rotatably attached to the free end of the hinge fitting (28). A drivebelt (32) is anchored at one end to the aircraft fuselage (12) and is attached at the opposed end to the universal shaft (30) so as to move in unison with the shaft. When the hinge assembly (14) of this invention is opened, the hinge fitting (28) pulls on the drivebelt (32) so as to cause its movement and the subsequent movement of the universal shaft (30). The universal shaft (30) is rotated about the hinge fitting (28) so as to maintain the door (10) attached thereto in a constant angular relationship relative to the longitudinal axis of the aircraft fuselage (12).

19 Claims, 7 Drawing Sheets

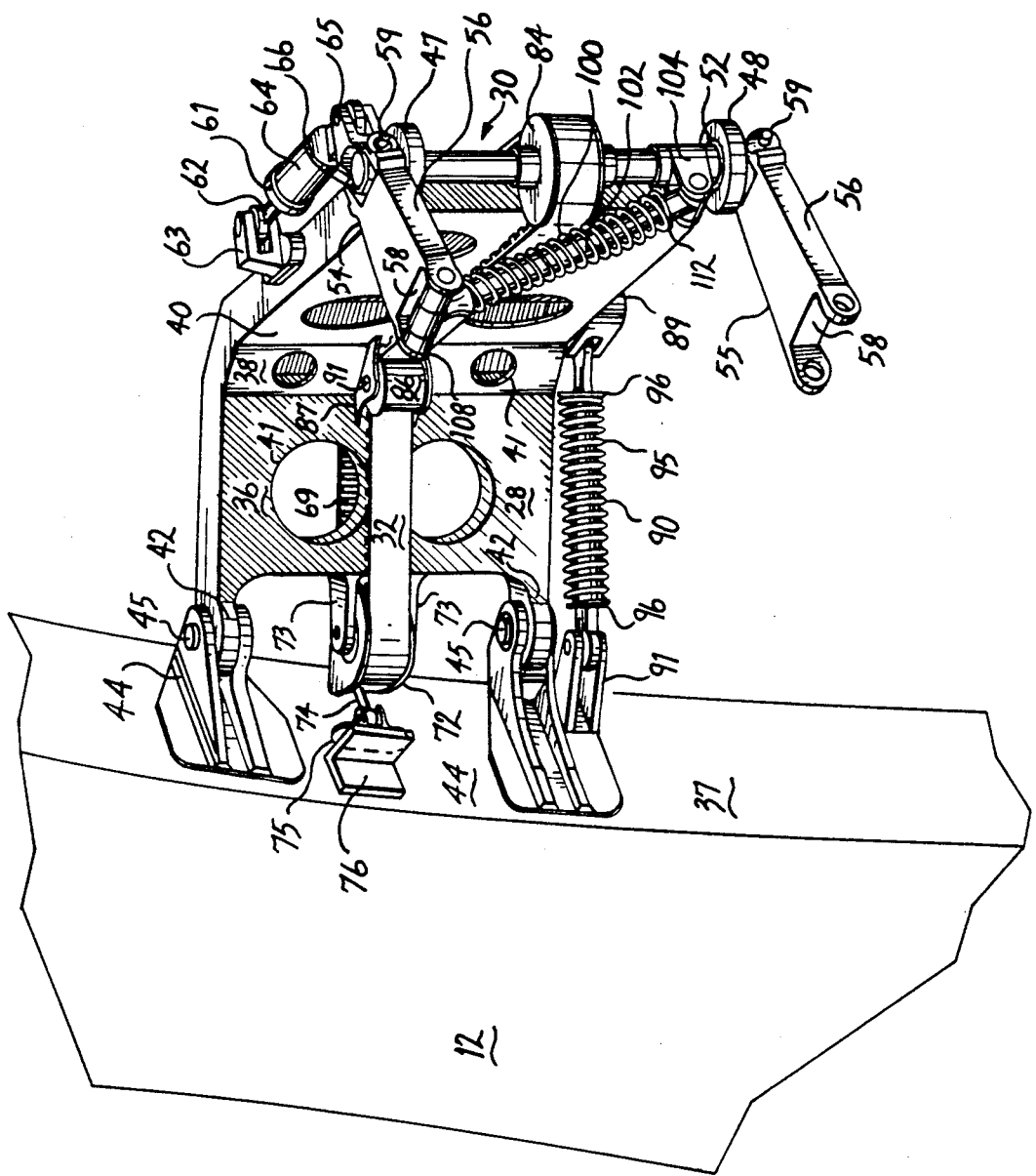

AIRCRAFT DOOR HINGE MECHANISM

FIELD OF THE INVENTION

This invention relates generally to aircraft door assemblies and, more particularly, to a hinge mechanism for connecting a translating-motion-type aircraft door to a fuselage.

BACKGROUND OF THE INVENTION

An integral part of an aircraft fuselage is the door assembly through which passengers and crew can enter and exit the aircraft. One type of door assembly that has become increasingly popular for use in commercial aircraft is the translating-motion-type door. This door, when opened, first moves up and away from the fuselage opening in which it is seated. Once the door clears the opening it is moved to one side of the opening so as to leave a free path for persons to enter and exit the aircraft. Translating doors take the place of conventional cocking type doors that are rotated inward and outward of the fuselage openings with which they are associated. A disadvantage of a cocking door is that, when opened, it is pivoted into the space inside the aircraft adjacent the entry/egress way adjacent the door. Consequently, the space inside the aircraft to the side of the door must be kept clear. A translating door, on the other hand, does not move into the space to the side of the door. As a result, when a translating door is installed in an aircraft, cabin units, such as galleys and lavatories, can be placed immediately adjacent the door entry/egress way. This increases the efficiency with which the space inside the fuselage is used. Also, translating-motion-type door assemblies weigh significantly less than cocking door assemblies for comparably sized openings. Moreover, translating doors typically include fewer components and are more economical to manufacture than similar cocking doors. Still another advantage of translating doors is that they move along a relatively straightforward up-and-out path when opened. In comparison to the inward rotation and outward movement of cocking doors, this feature makes translating-motion doors much easier to open. This feature is important because cabin attendants, who are often small in stature, sometimes find it physically difficult to open a cocking door.

An important part of any door assembly is the hinge that connects the door to the adjacent aircraft fuselage structure. A hinge used with a translating-motion-type aircraft door must be designed to allow the door to move up and down so that the door can move in and out of the associated fuselage opening. The hinge must further be arranged to allow the door to be moved away from the door opening so that the path in and out of the opening is clear. Moreover, once the door clears the opening, the hinge should allow the door to move along a path that is essentially parallel to the longitudinal axis of the airplane. In other words, the hinge is typically arranged so that, when the door is opened, the inside wall of the door is adjacent the outer skin of the aircraft. An advantage of this type of motion is that the effort required to move the door along a sliding path is substantially less than that required to pivot the door around the hinge as is required for cocking-type doors. Given that aircraft doors can weigh 300 pounds or more, any advances that reduce the effort required to open and close them are generally appreciated.

Many hinges used with translating-motion-type aircraft doors include both a structural hinge for securing the door to the aircraft and a mechanical linkage that provides a second door-to-fuselage connection. The mechanical linkage is employed to control the rotation of the door along its longitudinal axis so that, as the door is moved away from the fuselage, the door remains generally parallel to the outer skin of the aircraft. If the movement of the door was not controlled, the door would either swing free of the hinge and be difficult to maneuver and/or strike the outer skin of the fuselage.

A disadvantage of these hinges is that the linkages are composed of numerous interconnecting, movable mechanical parts. Providing these linkages appreciably adds to the overall cost of the hinges. Moreover, owing to the nature of their assembly, these mechanical linkages must be provided with rather long linkage members that add extra weight to the aircraft. This extra weight serves only to reduce the carrying capacity and operating efficiency of the aircraft. Owning to the nature of construction of these linkages, they are prone to require extensive and frequent maintenance. Furthermore, the rate at which these stiff linkage members apply angular momentum to rotate the door changes during the actual opening or closing cycle of door movement. As a result, as a door that is attached to this type of hinge is moved to the end of an opening or closing cycle, the amount of force needed to move the door increases. Moreover, the numerous cranks and drive rods of these linkages can be aesthetically displeasing to view.

SUMMARY OF THE INVENTION

This invention relates generally to a hinge assembly for connecting a translating-motion-type aircraft door to a fuselage. The hinge assembly of this invention includes a vertically oriented rotating universal shaft that functions as the interface between the aircraft door and a hinge fitting that physically connects the door to the aircraft fuselage. A drivebelt is wrapped around both the fitting and the universal shaft. One section of the drivebelt is held in place by a fixed sprocket or pulley adjacent the fuselage section to which the fitting is mounted. The opposed section of the drivebelt is wrapped around a sprocket attached to the universal shaft so as to rotate in unison with the shaft.

In some preferred embodiments of the invention, the drivebelt is in the form of a metal-reinforced rubber belt that is formed with teeth. The hinge fitting and the universal shaft are provided with sprockets that have teeth that engage the drivebelt teeth. In other preferred embodiments of the invention, a roller chain may be employed as the drivebelt. In still other preferred embodiments of the invention, a cable may be employed as the drivebelt. In these embodiments of the invention, the cable may be wrapped around pulleys that are attached to both the hinge fitting and the universal shaft.

When a door that is attached to an aircraft fuselage by the hinge assembly of this invention is opened, the hinge fitting is moved outward. Since the portion of the drivebelt section adjacent the hinge axis is held in place by the hinge axis sprocket, when the hinge fitting is moved outward, the outboard section of the drivebelt is pulled around the universal shaft to the inboard side of the hinge fitting. Since the drivebelt and the universal shaft sprocket interlock, the sprocket, the universal shaft, and the door, which is attached to the shaft, simultaneously rotate around the axis of the shaft. Thus, as the door moves outward, the movement of the drivebelt ensures that the lateral axis of the door remains in a constant angular relationship relative to the centerline of the aircraft. In other words, the door moves along a parallel motion path so that the outer skin of the door remains parallel to its original position. Thus, when the door is opened, the inside of the door is adjacent the outer skin of the aircraft.

When the door is closed, the drivebelt is pulled in the opposite direction. As a result, the door is rotated in the opposite direction. Thus, when the door is moved into the fuselage opening, it is correctly seated in the opening.

The drivebelt and sprockets of the hinge assembly of this invention pivot the door about the hinge fitting with a near-constant angular moment. This minimizes the development of peak loads on the hinge assembly, which could serve to fatigue the components forming the assembly, which in turn serves to reduce the rate at which the components wear out and need to be replaced. Also, the drivebelt system of the hinge assembly of this invention may be located in the center of the hinge arm fitting. This allows the loads developed by the drivebelt system to be distributed symmetrically along the hinge arm. This further serves to reduce the asymmetric loading of the components forming the hinge of this invention so as to further increase their overall useful lifetime.

Still another advantage of the hinge assembly of this invention is that the hinge requires fewer components. These components weigh less than other hinges that include linkages for ensuring proper movement of an aircraft door. Moreover, the belt system of this hinge assembly does not appreciably add to the overall width of the hinge assembly. Thus, when a door that is attached to this hinge assembly is opened, only a small section of the door opening is occupied by the portion of the hinge assembly that extends through the opening. This serves to maximize the width of the opening that is available for personnel to enter and exit the aircraft.

BRIEF DESCRIPTION OF THE DRAWINGS

This invention is pointed out with particularity in the appended claims. The above and further advantages of the invention may be better understood by referring to the accompanying description, taken in conjunction with the accompanying drawings, in which:

FIG. 3 is a side view illustrating the hinge assembly of this invention in greater detail;

DETAILED DESCRIPTION OF THE PREFERRED EMBODIMENT

Figure 1:
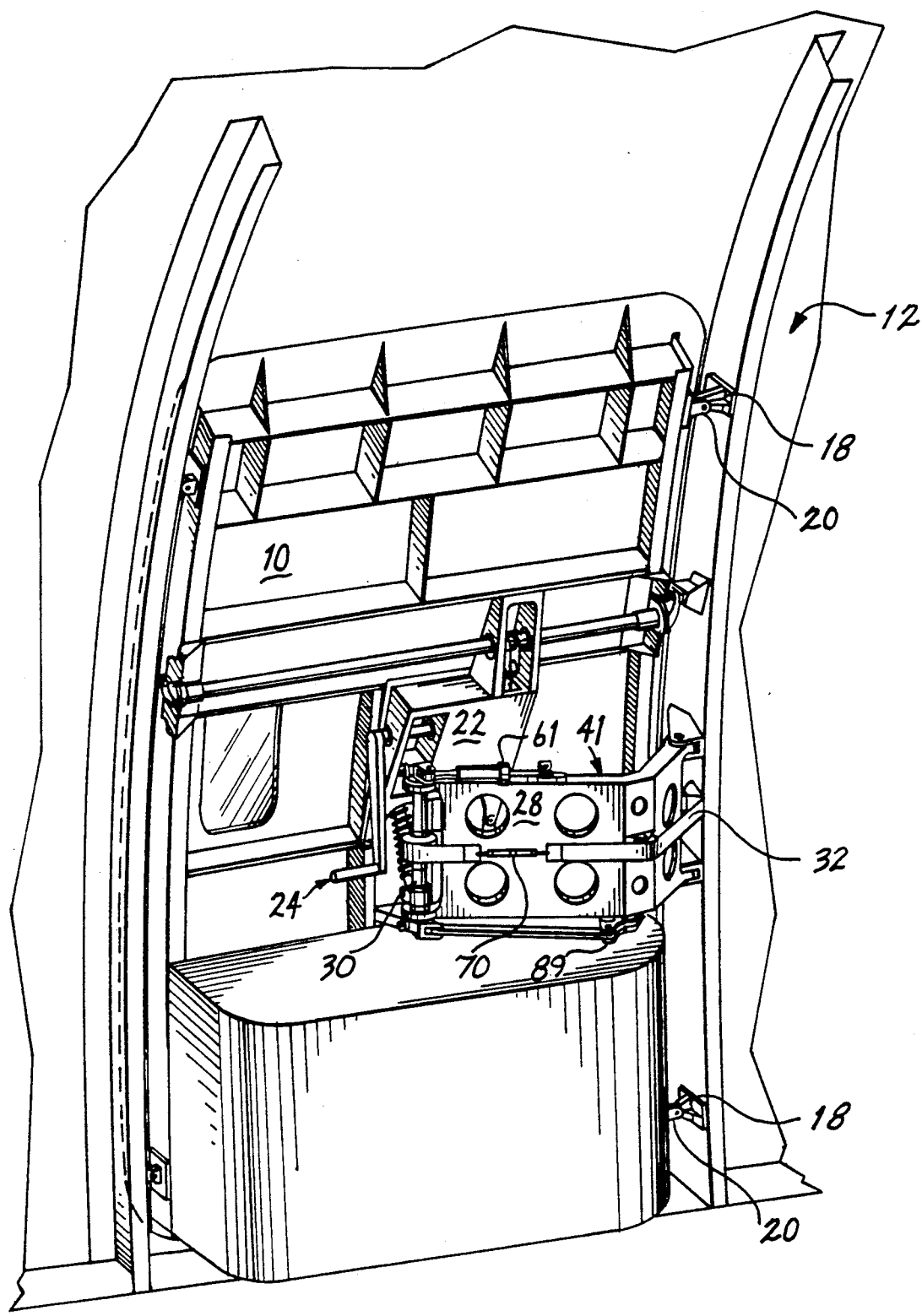
FIG. 1 is a side view illustrating an aircraft door assembly that is secured to an adjacent fuselage structure by the hinge assembly of this invention.

FIG. 1 illustrates an aircraft door 10 that is secured to a fuselage 12 by one preferred embodiment of a hinge assembly 14 of this invention. The aircraft door 10 is seated in an opening 16 (FIG. 4a) formed in the fuselage 12. The structural elements of the fuselage 12 that define the opening 16 are provided with fuselage stops 18 that extend into the opening. The aircraft door 10 is provided with outwardly extending doorstops 20 that complement the fuselage stops 18. When the door 10 is closed, the doorstops 20 are located inside and adjacent the fuselage stops 18. When the aircraft is in flight, the interior of the fuselage 12 is pressurized relative to the ambient environment; the resultant pressure differential serves to force the door 10 outward so that the doorstops 20 are urged against the fuselage stops 18 so as to lock the door in place. The opening and closing of the door 10 is controlled by a latch lock mechanism 22 that is secured to the inside of the door 10. The latch lock mechanism 22 opens the door 10 by first moving the door upward, so that doorstops 20 are clear of the fuselage stops, and then moving the door outward away from the fuselage opening 16. U.S. Pat. No. 4,720,065 for a "Translatable Outward Opening Plug-Type Aircraft Door and Actuating Mechanisms Therefor" by Hamatani, which is owned by the assignee of this application and is incorporated herein by reference, offers a detailed description of one such latch lock mechanism 22 for opening and closing the aircraft door 10 and how the latch lock mechanism is used to move the door so that the doorstops 20 clear the fuselage stops 18. The actuation of the latch lock mechanism 22 is controlled by a handle 24 that is part of the mechanism. A bustle 26, in which an inflatable escape slide (not illustrated) is stored, is secured to the base of the door 10. In the event of an emergency, the escape slide can be quickly deployed to facilitate rapid exit from the aircraft.

Figure 2:
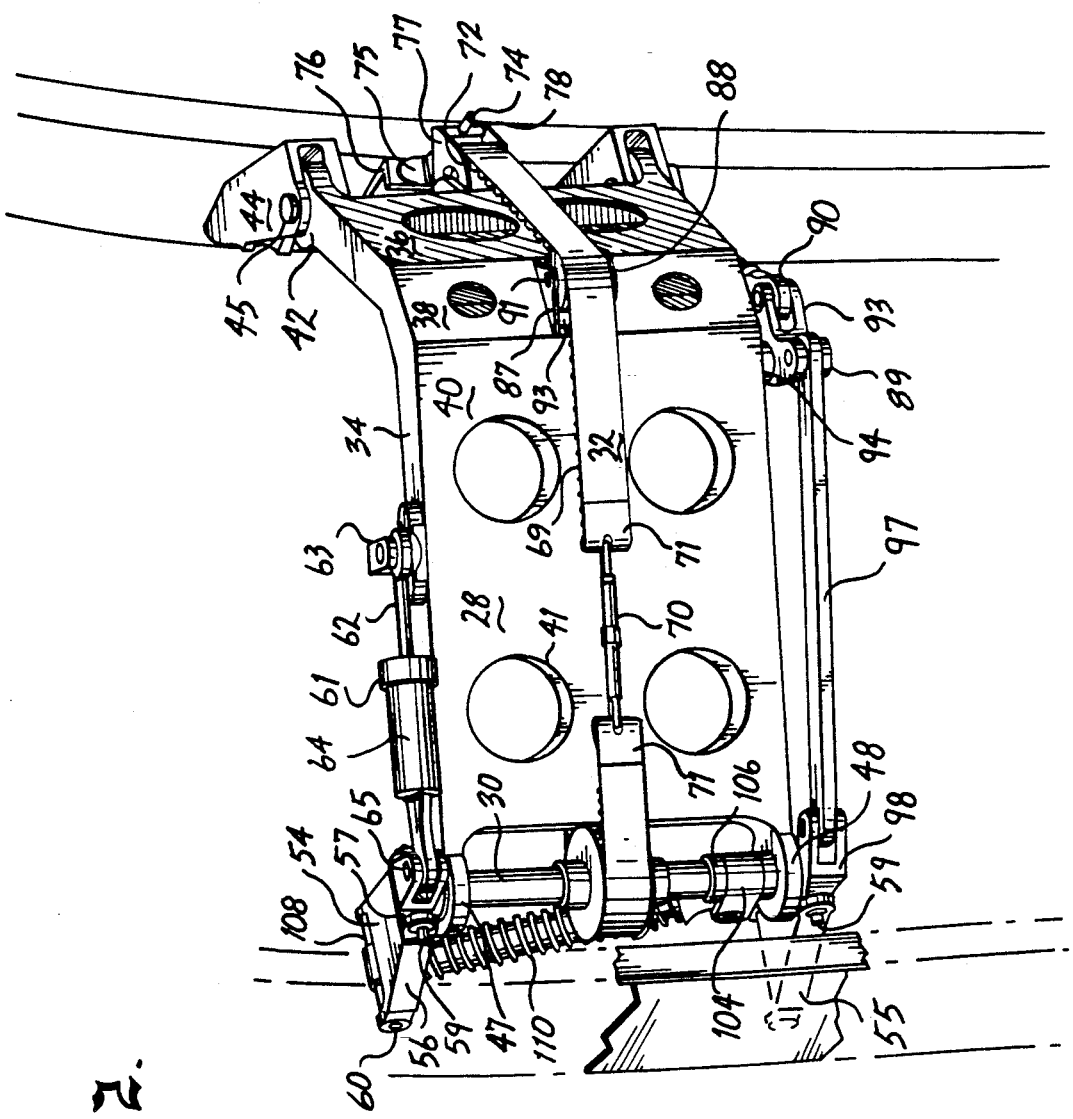
FIG. 2 is a side view illustrating the hinge assembly of this invention in greater detail.

The hinge assembly 14 of this invention, as depicted in detail in FIGS. 2 and 3, includes a fitting 28 that provides the primary structural connection between the fuselage 12 and the aircraft door 10. The door 10 is connected to the fitting 28 by a vertically oriented universal shaft 30 that is rotatably secured to the fitting. A drivebelt 32 extends around both the fitting 28 and the universal shaft 30. The drivebelt 32 is anchored in place adjacent the fuselage 12/fitting 28 interface; the drivebelt is attached to the universal shaft 30 to rotate in unison therewith. Consequently, when the door 10 is opened, the drivebelt 32 rotates the universal shaft 30 so that the door maintains a constant angular orientation relative to the centerline of the aircraft.

The fitting 28 is generally in the form of a three-section irregularly shaped hollow aluminum box 34. The box has a first, or shoulder, section 36 that is secured to the fuselage 12 adjacent the opening 16. A second, or elbow, section 38, which has a relatively short width in comparison with the other two sections, is located at the distal end of the shoulder section 36. A third, outboard, section 40, which has the longest length of the three sections, extends outward from the elbow section 38. The horizontal axes of the three box sections 36, 38, and 40 are offset from each other so as to ensure that, when door 10 is opened, the door will be spaced to the side of the opening 16 so as to allow easy access into and out of the aircraft. In a preferred embodiment of the invention, the axis of elbow section 38 is offset approximately 15 degrees from the axis of the outboard section 40; the axis of the shoulder section 36 is offset approximately 30 degrees from the axis of the elbow section. Each of the fitting sections 36, 38, and 40 is formed with cutouts in the form of circular openings 41. The openings 41, which are formed as part of the process of casting the hollow box 34, reduce the weight of the fitting 28 and the overall weight of the hinge assembly 14.

The fitting 28 is connected to the aircraft fuselage 12 by a pair of horizontally oriented lugs 42 that extend outward from the opposed ends of the shoulder section 36. The lugs 42 are secured to complementary hinge clevises 44 that are mounted to a frame member 37 adjacent the opening 16 that forms part of the structural skeleton of the fuselage 12. Pins 45, which extend through coaxial openings in the clevises 44 and the lugs 42, actually secure the fitting 28 to the frame member 37. The axis along which the hinge assembly 14 is mounted to the fuselage, which is the axis about which the hinge pivots, is referred to as the hinge axis.

The universal shaft 30 is mounted to a pair of horizontally aligned upper and lower lugs, 47 and 48, respectively, that extend outward from the opposed ends of the fitting outboard section 40. The universal shaft 30 is mounted in a pair of coaxial openings, not identified, formed in the lugs 47 and 48, which are integrally formed with the hinge fitting 28. Bearing assemblies 52, which are disposed around the outside of the lug openings, provide a low-friction interface between the shaft 30 and the lugs 47 and 48 so as to allow the shaft to freely rotate. The universal shaft 30 is dimensioned to extend above the topmost lug 47 and below the bottommost lug 48.

The aircraft door 10 is connected to the universal shaft 30 by an upper lift link 54 and a lower lift link 55. The upper lift link 54 is pivotally connected at one end to the end of the shaft 30 above the upper lug 47 and at the other end to the aircraft door 10. The lower lift link 55 is pivotally connected at one end to the end of the shaft that extends below the lower lug 48 and at its other end to the aircraft door 10. The pivotal connections of the lift links provide the links with the ability to move in a parallel or pantograph motion so the door 10 can move vertically relative to the hinge fitting 28.

In the illustrated embodiment of the invention, each lift link 54 and 55 is formed from an integral piece of metal and has a pair of opposed, vertically aligned flanges 56. The flanges 56 are connected by a pair of spaced-apart webs 57 and 58. The lift links 54 and 55 are shaped so the interflange spacing is narrower adjacent the universal shaft 30 and widest where the links are secured to the door 10. Pins 59 extend through coaxial openings, not identified, in the lift link flanges 56 and the universal shaft 30 to mount the lift links 54 and 55 to the shaft. Pins 60 extend through coaxial openings formed in the opposite ends of the link flanges 56 and structural elements of the aircraft door 10, elements not identified, to couple the door 10 to the lift links 54 and 55. The flanges 56 of the upper lift link 54 have a slight downward circular offset adjacent the upper lug 47. The flanges 56 of the lower lift link 55 have a complementary upward offset adjacent the lower lug 48. The offsets serve to minimize the point of contact of links 54 and 55 against the lugs 47 and 48, respectively, so as to reduce overall wear of the hinge assembly 14.

A snubber 61 is connected between universal shaft 30 and the hinge fitting 28. The snubber includes a piston rod 62 that is pivotally connected at one end to a fitting 63 that is attached to the top of the hinge fitting outboard section 40. The opposed end of the piston rod 62 is formed with a pistonhead, not illustrated, which is disposed inside a hydraulic cylinder 64. The free end of the hydraulic cylinder 64 is attached to bellcrank 65 that is secured to the top of the universal shaft 30. The bellcrank 65 is formed with a locking ring 66 that is located above the hinge fitting upper shaft lug 47 and between the upper lift link flanges 56. The locking ring 66 is formed with a pair of coaxial openings (not illustrated) and is mounted to the universal shaft 30 so that pin 59 extends through the lock ring openings so as to hold the bellcrank 65 in place.

The drivebelt 32 rotates the universal shaft 30 in response to the movement of the hinge fitting 28. In one embodiment of the invention, the drivebelt 32 is a wire-reinforced belt that extends around the fitting 28 and the universal shaft 30. The drivebelt is formed with teeth 69 that extend across the belt and are directed inward toward the fitting 28. In the illustrated embodiment of the invention, the drivebelt is an open-ended belt; the ends of the belt are connected by a turnbuckle 70. The turnbuckle 70 is connected to coupling pins (not illustrated) that are held in place by reinforcing wraps 71 that are integral with the opposed ends of the drivebelt 32. The turnbuckle 70 facilitates the rapid installation and removal of the drivebelt 32 and the proper tensioning of the drivebelt to ensure correct operation of the hinge assembly 14.

The section of the drivebelt 32 located adjacent the fuselage is partially wrapped around a hinge axis sprocket 72 that is secured to the hinge fitting 28. The hinge axis sprocket 72 is secured to the fitting 28 by a pair of spaced-apart lugs 73 that extend out from the fitting. The hinge axis sprocket 72 is rotatably mounted to the fitting sprocket lugs 73 by a pin 45 that is centered along the hinge axis. The hinge axis sprocket 72 is secured in place by an adjustable anchor 74 that is secured to the fuselage 12. The anchor 74 is in the form of an elongated pin that is pivotally mounted to a mounting plate 75. In the illustrated embodiment of the invention, the mounting plate is secured to an L-shaped flange 76 that is attached to the fuselage 12 adjacent the opening 16. A pair of teardrop-shaped anchor plates 77 are fixedly attached to the opposed sides of the hinge axis sprocket 72. A trunnion 78 extends between the pointed ends of the anchor plates 77. The trunnion 78 is formed with an opening in which the anchor 74 is secured so as to prevent the hinge axis sprocket 72 from rotating. The anchor 74 may be secured to the trunnion 78 by a fastener located on the free end of the anchor. Alternatively, the anchor 74 and the opening in the trunnion 78 may be formed with complementary threading so as to secure the trunnion to the anchor.

The section of the drivebelt 32 that is disposed around the universal shaft 30 is coupled to shaft sprocket 84. The shaft sprocket 84 is fitted over the universal shaft 30 and coupled to the shaft to turn in unison therewith. The profile of the drivebelt is approximately conformed to the profile of the hinge by a pair of idler sprockets 86 and 88. The idler sprockets are rotatably mounted to the hinge fitting on opposed sides of the elbow section 38; idler sprocket 86 is mounted to the inboard portion of the section and idler sprocket 88 is mounted to the outboard portion of the section. The idler sprockets 86 and 88 are mounted to pairs of opposed, spaced-apart tabs 87 that extend perpendicularly outward from both sides of the fitting elbow section 38. Bolts 91, which extend through coaxial openings in the tabs 87 and sprockets 86 and 88, rotatably secure the sprockets to the hinge fitting. The fitting 28 is formed with rectangular cutaway openings 83 between the sprockets so as to facilitate the partial seating of the sprocket in the elbow section. The inboard sprocket, idler sprocket 86, is positioned so that the toothed surface of the drivebelt 32 is disposed against the sprocket. The outboard sprocket, idler sprocket 88, is positioned so that the outer surface of the drivebelt 32 is disposed against the sprocket. In other words, the drivebelt is located between the hinge fitting 28 and the outboard idler sprocket 88.

The hinge assembly 14 of the illustrated embodiment of this invention is further provided with a spring guide assembly 89 that is connected between the fitting 28 and the universal shaft 30. The spring guide assembly 89 includes a guide member 90 that is formed from two telescoping tubes that are arranged so that one tube can be selectively pulled away from the other tube. One end of the guide member 90 is pivotally attached to a guide clevis 91 that is secured to the fuselage 12 immediately below the lower of the two hinge clevises 44. A pin 92 secures the guide member 90 to the clevis 91 along an axis that is slightly outboard of the hinge axis. The opposed end of the guide member 90 is pivotally attached to one end of an L-shaped crank 93. The crank 93 is pivotally attached to the fitting outboard section 40 at a point adjacent the elbow section 38/outboard section 40 interface. The crank 93 is secured to the fitting 28 by a pin assembly 94 that extends downward from the fitting. A spring 95 is disposed over the guide member 90. The spring 95 is disposed between two annular stop rings 96 that are integrally secured to the opposed ends of the guide member 90 so that the spring normally imposes a biasing force that urges the sections of the guide member away from each other.

A linkage arm 97 is connected between the crank 93 and the universal shaft 30. One end of the linkage arm 97 is pivotally connected to the free end of the crank 93. The opposed end of the linkage arm 97 is pivotally connected to a crank 98 that is connected between universal shaft 30 and the lower lift link 55. The crank 98 has a locking ring 99, partially shown, that is disposed around the universal shaft 30 and between the lower lift link flanges 56. The pin 59 that secures the lower lift link 55 to the universal shaft also extends through the crank lock ring 99 so as to ensure that the crank 98 and shaft will rotate in unison.

A counterbalance assembly 100 extends between the universal shaft 30 adjacent the lower lug 48 to the upper lift link 54 to facilitate the raising and opening of the door 10. The counterbalance assembly includes a two-section counterbalance guide 102 that is arranged so that one section can telescope away from the other section. The lower end of the counterbalance guide 102 is connected to the universal shaft by a U-shaped mounting bracket 104. The mounting bracket 104 is secured around a tubular fitting 106 that is fitted over the universal shaft 30 and rests on top of the lower lug 48. The opposed end of the counterbalance guide is formed with a cylindrical fitting 108 that is oriented normal to the axis of the guide. The pin 60, which couples the upper lift link 54 to the aircraft door 10, also extends through an opening in the fitting 108 so as to also secure the fitting to the door.

A coil spring 110 is disposed over the telescoping sections of the counterbalance guide 102. The opposed ends of the counterbalance guide 102 telescoping sections are provided with annular spring stops 112 that limit expansion of the spring 110. The spring stops 112 may be integrally formed with the counterbalance guide 102 or separate components that are fitted into place. When the door 10 is closed, the counterbalance guide 102 is at its shortest length and the compression of the spring 110 is maximized. When the latch lock mechanism is actuated to open the door 10, the counterbalance guide 102 and the spring 110 are allowed to expand. This expansion, which is driven by the biasing force of the spring 110, serves to move the door upward so as to facilitate opening of the door.

Figure 4A:
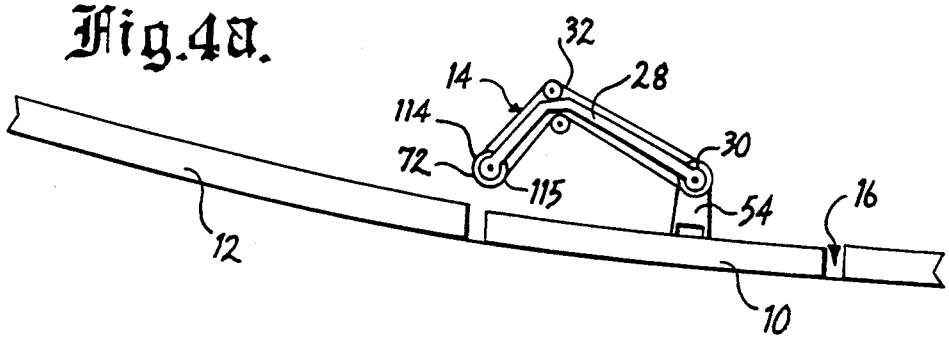
FIGS. 4a through 4c are diagrammatic illustrations that represent the operation of the hinge assembly of this invention.
Figure 4B:
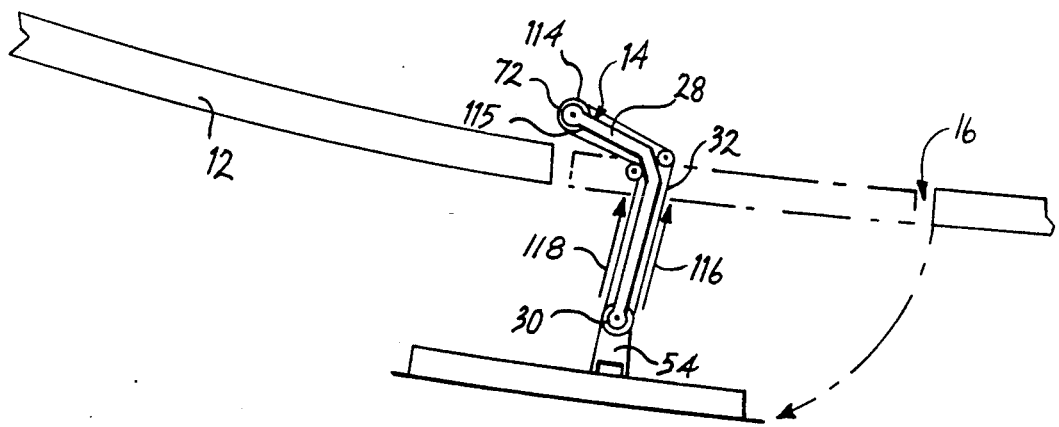
Figure 4C:
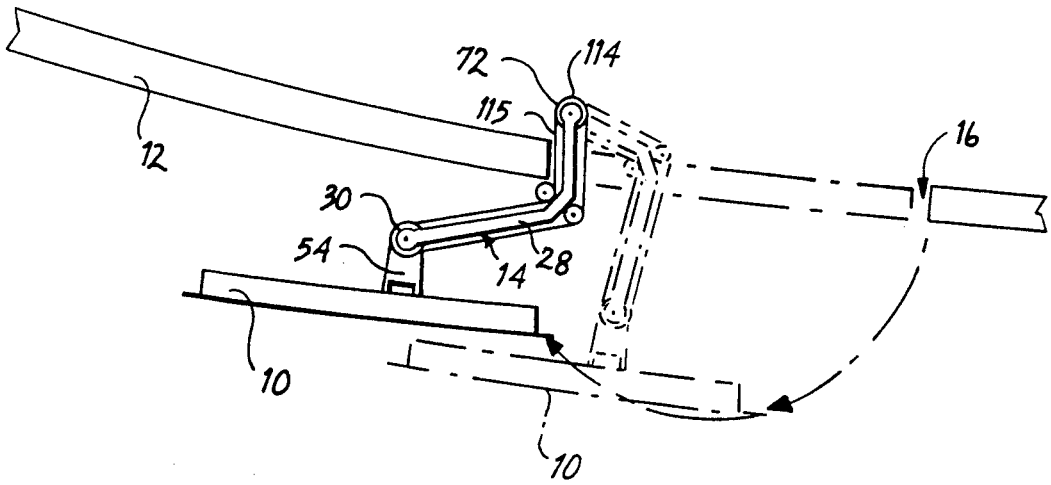

When the door assembly 10 with which the hinge assembly 14 of this invention is employed is first opened, the latch lock mechanism 22 initially moves the door generally upward so that the doorstops 20 clear the fuselage stops 18. The pantograph connection between the door 10 and the hinge 14 established by the lift links 54 and 55 allows the door 10 to move vertically. Once the door 10 is lifted clear of the fuselage stops 18, the pivotal connection of the hinge fitting 28 to the fuselage 12 along the hinge axis can be used advantageously to move the door outward, away from the door opening 16. As illustrated by FIGS. 4a through 4c, during this movement, the drivebelt 32 pivots the universal shaft 30 about its axis so as to maintain the door 10 in a substantially constant angular relationship with the longitudinal axis of the aircraft. As depicted in FIG. 4a, when the door 10 is closed, a section of the drivebelt, identified as point 114, located in the inboard side of the hinge fitting 28, is positioned immediately adjacent the section of the drivebelt that is wrapped around the hinge axis sprocket 72. There is a second section of the drivebelt, point 115, that is located directly across from point 114 on a line passing through the hinge axis. When the hinge axis fitting 28 is pivoted outward to move the door 10 away from the opening 16, the hinge axis sprocket 72 holds the drivebelt 32 in place. Thus, as the hinge fitting 28 pivots, point 114 on the drivebelt is wrapped around the hinge axis sprocket 72, and point 115 on the drivebelt is unwrapped from the sprocket as depicted in FIG. 4b. As a consequence of these movements, the inboard section of the drivebelt if pulled toward the hinge axis sprocket 72 as depicted by arrow 116. Since the drivebelt 32 is connected to the universal shaft sprocket 84, the universal shaft sprocket rotates with the movement of the drivebelt. The rotation of the universal shaft sprocket 84 causes simultaneous rotation of both the universal shaft 30 and the door 10 attached thereto. Consequently, the door 10 pivots about the universal shaft axis. Thus, as the hinge axis fitting 28 is moved outward, the door 10 is simultaneously pivoted about the universal shaft axis so that the door maintains a constant angular relationship with the longitudinal axis of the aircraft. In other words, as the door 10 moves between the closed and open positions, the hinge assembly 12 pivots the door so that the door maintains a parallel orientation with the sections of the aircraft fuselage 12 that define the door opening 16.

When the hinge fitting 28 is moved completely outward, the movement of the drivebelt 32 will pivot the door 10 so that the inside skin of the door is adjacent the outer skin of the aircraft fuselage 12 as depicted in FIG.

4c. Owing to the angular offset between the hinge fitting shoulder section 36 and the outboard section 40, the door is further positioned so as to be laterally spaced away from the fuselage opening 16. Consequently, the extent to which either the door or the hinge assembly 14 extends through the opening or the path established is minimized. This reduces the extent to which either the door 10 or the hinge assembly 14 interferes with the entrance and egress of persons into and out of the aircraft.

The outward movement of the door 10 is assisted by the spring guide assembly 89. When the door 10 is closed, the tubes forming the guide member 90 are compressed. The outer tube overlaps the inner tube so as to result in the maximum compression of the spring 95. When the hinge fitting 28 is pivoted outward, the spring 95 is allowed to expand. The expansion of the spring 95 moves the tubes forming the guide member 90 apart. Guide member 90, in turn, works against the fitting crank 93, which causes linkage arm 97 to rotate universal shaft crank 98. Since crank 98 is connected to the universal shaft 30, the rotation of the crank serves to rotate both the shaft and door 10 attached thereto. Thus, the expansion of the spring 95 provides some of the energy needed to rotate the door 10 as it is moved away from the opening 16. While the spring guide assembly 89 provides an added force for opening the door 10, the snubber 61 serves to slow the actual movement of the door away from the opening 16. The resistance of the fluid in the hydraulic cylinder 64 to the extension of the piston rod 62 damps the outward movement of the door 10 to prevent it from rapidly jerking open when the guide assembly spring 95 expands.

When the door 10 is closed, the movement of the hinge fitting 28 causes the inboard section of the drivebelt 32 to be pulled toward the hinge axis sprocket 72, as represented by arrow 118 in FIG. 4b. Consequently, the universal shaft sprocket 84 is rotated in a clockwise direction. The movement of the sprocket 84 causes simultaneous movement of the universal shaft 30 and the door 10. Thus, when the hinge fitting 28 is pivoted completely inside the fuselage 12, the door 10 is properly seated in the opening 16.

The drivebelt 32 and associated sprockets of the hinge assembly 14 of this invention can all be located along the centerline of the associated hinge fitting 28. Moreover, the drivebelt 32 of hinge assembly 14 serves to pivot the door simultaneously with movement of the hinge fitting 28. These features eliminate the development of peak loads on the components that form the hinge assembly 14 when the door 10 is moved in and out of the opening 16. This minimizes both the weight and cost of these components of this invention. Still another related advantage of this invention is that the hinge assembly 14 is formed of relatively few components, only several of which are required to move. This further reduces the overall cost of assembling and maintaining the hinge assembly of this invention.

Still another advantage of the hinge assembly of this invention is that only a relatively narrow section of the assembly extends through the fuselage opening 16. Specifically, in some preferred embodiments of the invention the width of the hinge fitting shoulder section 36 and the drivebelt 32, the parts of the assembly that extend through the fuselage opening 16, are relatively narrow, less than 4.5 inches and, in more preferred embodiments of the invention, less than 3.0 inches. In other words, only a small section of the hinge assembly of this invention extends through the fuselage opening 16. Thus, the hinge assembly of this invention only minimally interferes with the entry and exit of persons to and from the aircraft.

Figure 5:
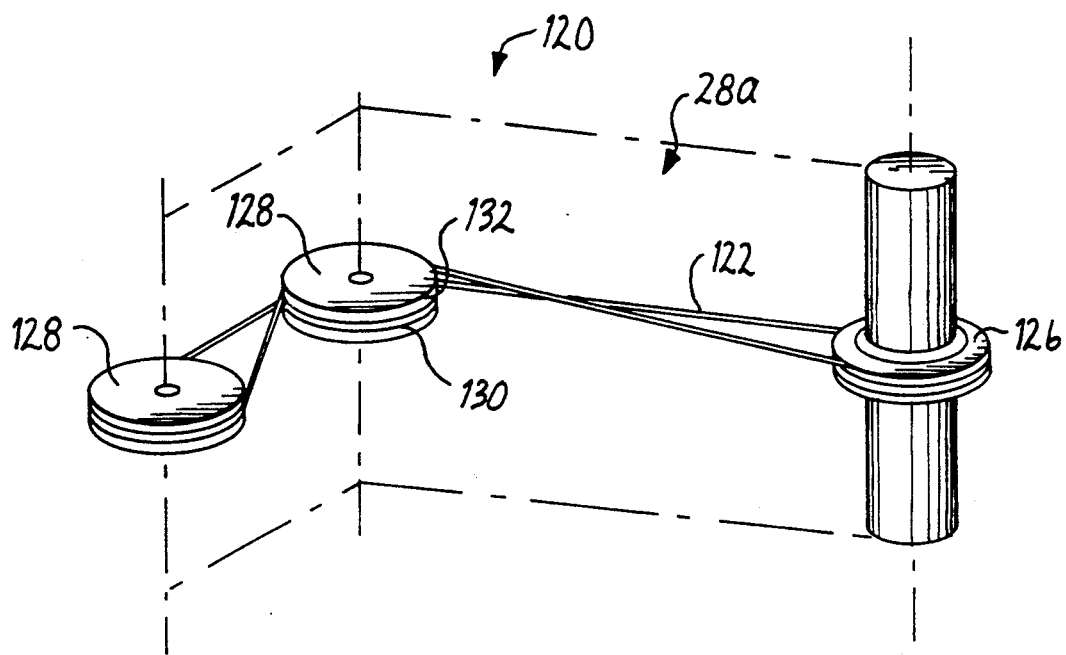
FIG. 5 illustrates an alternative drivebelt assembly that can be employed in the hinge assembly of this invention.

As depicted in FIG. 5 in an alternative hinge assembly 120 of this invention, a closed-loop cable 122 is employed as the drivebelt for pivoting the universal shaft 30. In this FIGURE, the hinge fitting 28a is shown in a diagrammatic phantom view. In this embodiment of the invention, the cable 122 is wrapped at one end around a fixed hinge axis pulley 124 that is anchored to the aircraft fuselage 12. The cable 122 and hinge axis pulley 124 are arranged so that the portion of the cable 122 adjacent the pulley does not move. The opposed end of the cable 122 is wrapped around a universal shaft pulley 126 that is fitted over the universal shaft 30. The cable 122 is further wrapped around an idler pulley 128 that is attached to the elbow of the hinge fitting 28. Idler pulley 128 is a two-spindle pulley that is located adjacent the inboard surface of the hinge fitting 28a. The cable 122 is wrapped around the pulley 128 such that the separate sections of the cable are each wrapped around a separate one of the pulley spindles 130 and 132. In these embodiments of the invention, the hinge fitting 28a would be formed with the appropriate openings so that the cable 122 can be looped around the pulley spindles 130 and 132. In some versions of this embodiment of the invention, the cable 122 may be provided with a turnbuckle (not illustrated) to facilitate its installation and removal.

Figure 6:
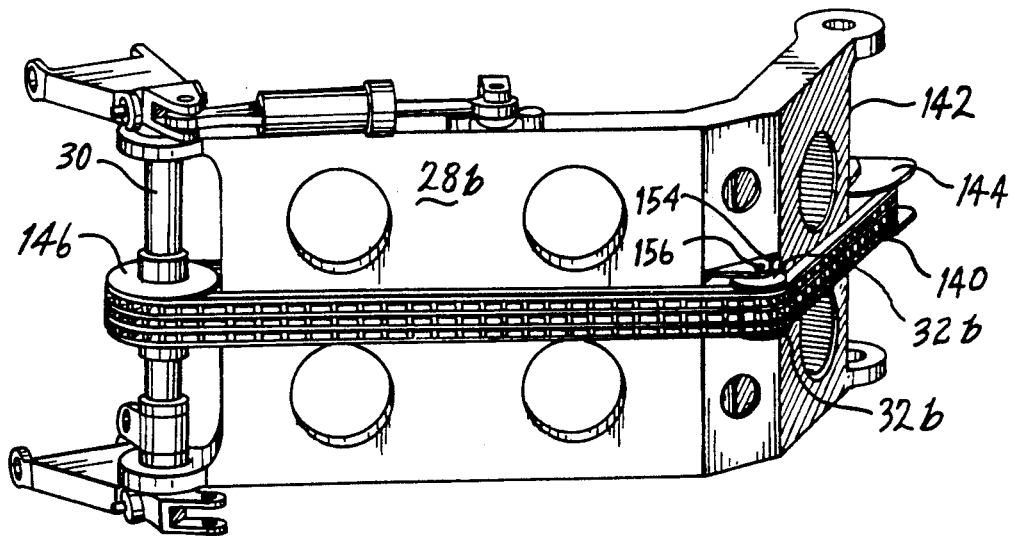
FIG. 6 is a side view of the hinge assembly of this invention illustrating another alternative embodiment of the drivebelt assembly that can be employed with this invention.

The hinge assembly 122 of this embodiment of the invention works in the same manner as the previously described hinge assembly 14; movement of the hinge fitting 28b causes the cable 122 to be pulled around the hinge axis pulley 124 so as to cause the cable to pivot the universal shaft pulley around the shaft axis. FIG. 6 illustrates how a roller chain 140 can be employed as the drivebelt in another embodiment of a hinge assembly 142 of this invention. In this embodiment of the invention, the roller chain 140 is a closed-loop chain that is wrapped around a hinge axis sprocket 144, a universal shaft sprocket 146, and a pair of sprockets 148, only one shown, in a manner similar to the previously described drivebelts. Selective tension can be placed on the roller chain 140 by providing an adjustably positionable idler sprocket. For example, in the illustrated embodiment of the invention, the outboard idler sprocket can be selectively positioned at tabs 32b that are integral with the fitting 28b. Specifically, the tabs 32b are formed with a pair of parallel elongated slots 154. Bolt 156, which couples the outboard idler sprocket 148 to the tabs, can be selectively positioned in the slots so as to allow the sprocket to be selectively positioned relative to the tabs. In this manner, the roller chain 140 can be tensioned as desired.

Figure 7:
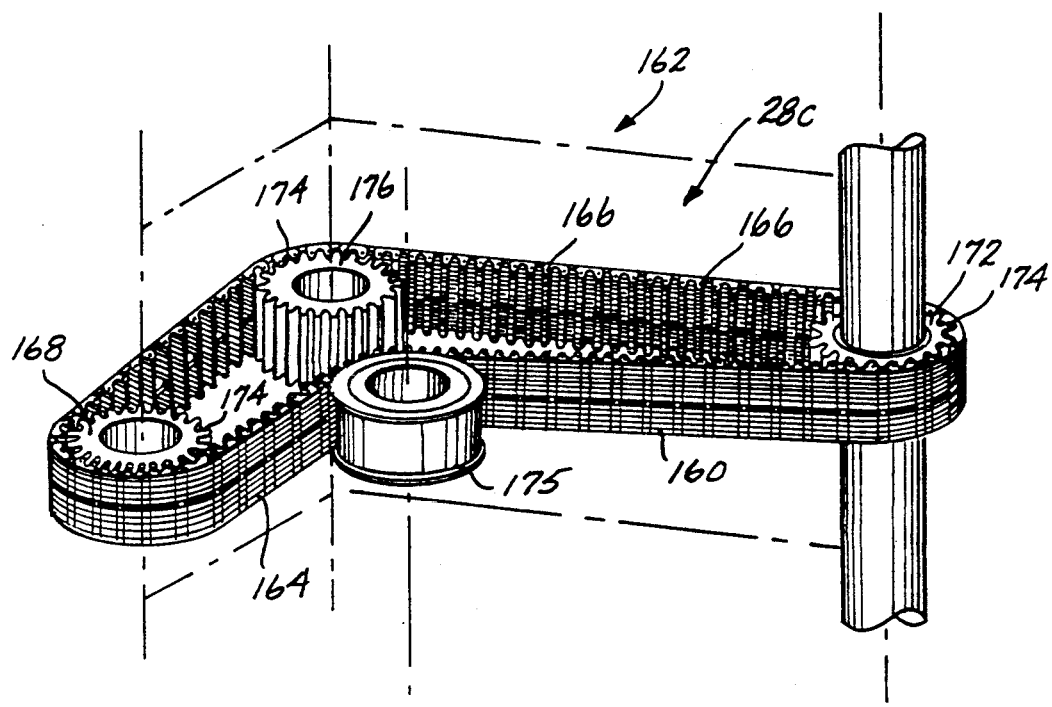
FIG. 7 is a side view of another alternative drivebelt assembly that can be employed with this invention.

As depicted by FIG. 7 a silent chain 160 can alternatively be employed as the drivebelt in another embodiment of the hinge assembly 162 of this invention. The silent chain 160 is formed from a set of links 164, each of which is shaped with end sections that form inwardly directed teeth 166. The hinge assembly 162 is provided with a hinge axis sprocket 168 and a universal shaft sprocket 172, both of which are formed with teeth 174 into which the chain teeth 166 interlock. Hinge assembly 162 is also provided with an inner sprocket 175 and outer idler sprocket 176, located at the elbow of the hinge fitting 28c, shown in diagrammatic phantom. The outer idler sprocket 176 is provided with teeth identical to the teeth 174 formed integrally with the hinge axis sprocket 168 and the universal shaft sprocket 172. The inner idler sprocket 175 is not similarly provided with teeth; the outer surface of the silent chain 160 is disposed against the surface of the sprocket. Either one or both of the idler sprockets 176 may be moved laterally so that the chain 160 can be appropriately tensioned.

Figure 8:
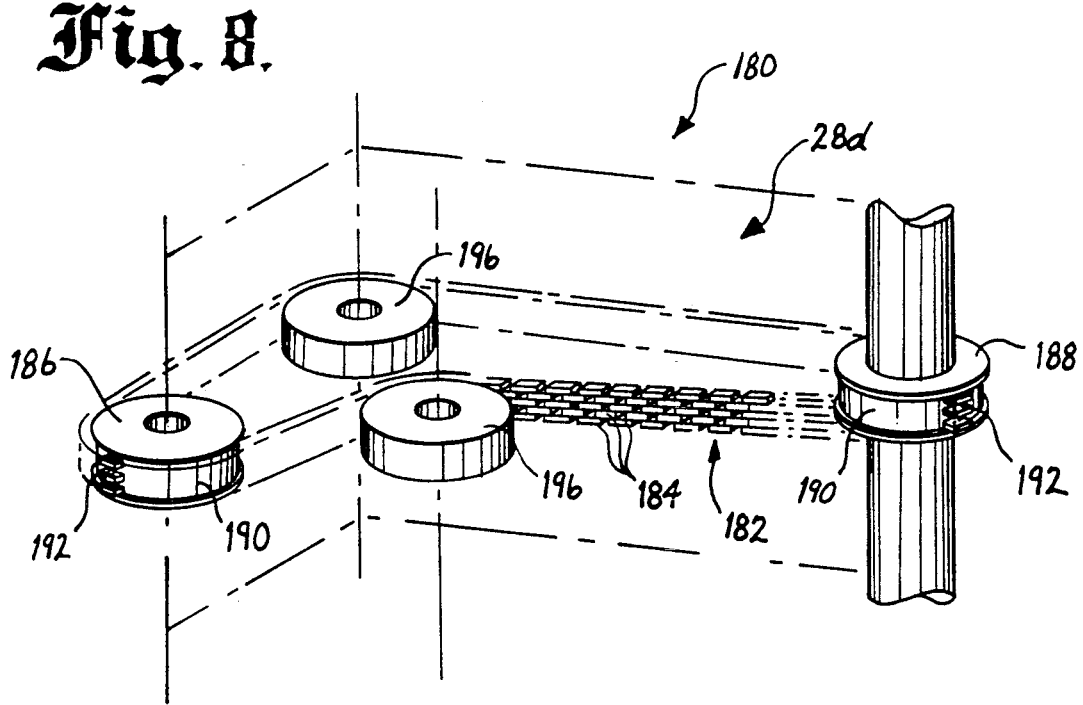
FIG. 8 is a side view of another alternative drivebelt assembly that can be employed with this invention.
Figure 9:
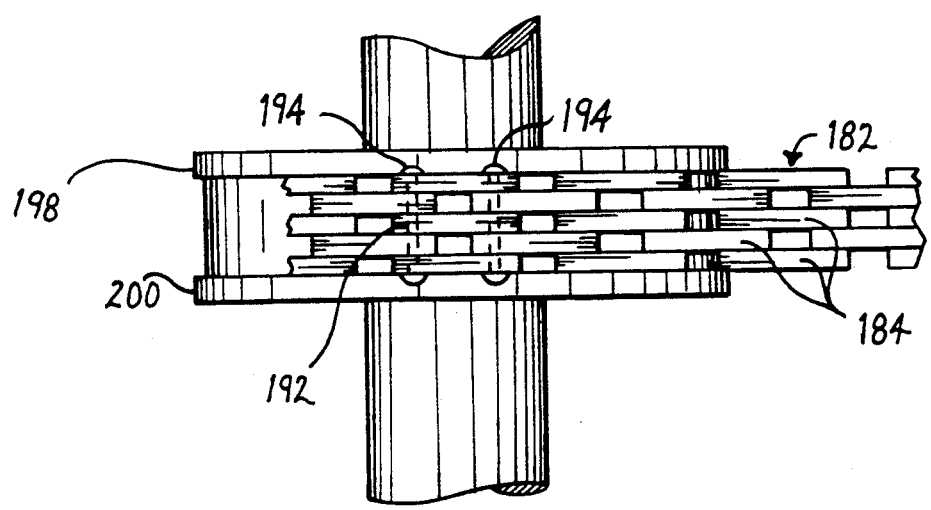
FIG. 9 is a detailed side view of the drivebelt assembly of FIG. 8.

FIG. 8 depicts a hinge assembly 180 of this invention wherein a leaf chain 182 is employed as the drivebelt. The leaf chain 182 is formed of a set of links 184 that are secured together, so that the end of one link overlaps the ends of the laterally adjacent links. The arrangement of the links 184 gives the chain 182 a flat, belt-like appearance. A hinge axis sprocket 186 and a universal shaft sprocket 188 are rotatably coupled together by the chain 182. The hinge axis sprocket 186 and the universal shaft sprocket 188 are formed with generally cylindrical outer surfaces 190 around which the chain 182 is wrapped. The chain 182 is coupled to the sprockets 186 and 188 by a set of sprocket lugs 192 that extend outward from the sprocket outer surfaces 190. The sprocket lugs 192 on each sprocket 186 and 188, as seen in detail in FIG. 9, are spaced apart and are in parallel alignment with each other. The sprocket lugs 192 are fitted into complementary spaces formed in the chain 182 by the removal, or absence, of a set of alternating links 184 from the chain. The chain 182 is coupled to the sprockets 186 and 188 by a set of pins 194 that extend through coaxial openings formed in the sprocket lugs 192 and the adjacent alternating links 184 that remain in the chain.

Hinge assembly 180 further includes a pair of idler sprockets 196 that are attached to the elbow section of the hinge fitting 28d shown in diagrammatic phantom. One or both of the idler sprockets 196 may be provided with sprocket lugs (not shown) that are fitted into complementary openings formed in the chain 182. The hinge axis sprocket 186, the universal shaft sprocket 188, and the idler sprockets 196 are each provided with a pair of upper and lower plates, 198 and 200, respectively, as seen most clearly in FIG. 9. The plates 198 and 200, located on either side of the sprockets 186, 188, and 196, are washer-like in structure. The plates 198 and 200 are also dimensioned to project out a slight distance beyond the sprockets 186, 188, and 196. The plates 198 and 200 thus slightly overlap the chain 182 so as to prevent lateral movement.

An advantage of the hinge assemblies 162 and 180 is that silent chain 160 and leaf chain 182 offer the same strength as other chains and they also occupy less space. Moreover, still another advantage of the leaf chain 182 is that it is relatively lightweight.

This description is for the purposes of illustration only. Alternative embodiments of the invention are possible without departing from the scope of the claimed invention. For example, it is clear that drivebelts other than those disclosed can be employed to serve as a connection between the hinge axis sprocket and the universal shaft sprocket. Moreover, while in the disclosed embodiments of the invention the drivebelt is in the form of a continuous closed loop, in other embodiments of the invention the drivebelt may be an open looped belt that is connected at one end to the aircraft fuselage and at the opposite end to the universal shaft. In these embodiments of the invention it would be necessary to attach a biasing mechanism, for example, a torsion spring, between the universal shaft and the hinge fitting so as to restore the universal shaft to the correct position each time the door is closed. Thus, in these embodiments of the invention the drivebelt would serve to rotate the universal shaft and a door attached thereto in one direction when the door's hinge fitting is moved open. Then, when the door is closed, the belt would be slackened and the biasing mechanism would rotate the shaft in reverse direction so as to ensure that the door maintained the correct angular orientation.

Moreover, it should similarly be understood that there is no requirement that the disclosed invention be provided with a hinge axis sprocket. The portion of the drivebelt adjacent the aircraft fuselage may be secured to any surface or element, even the fuselage itself, as long as it remains stable. In this manner, whenever the hinge is moved open, the hinge fitting will pull the drivebelt in the appropriate direction so as to cause the desired rotation of the universal shaft. Similarly, it should be understood that the spring guide assembly 89 and the counterbalance assembly 100 may not be incorporated into each and every embodiment of this invention. Some embodiments of this hinge assembly 14 may have both assemblies 89 and 100, others may have one but not the other, and still others may not include either of them. It should further be obvious that the hinge assembly could be arranged so that the universal shaft is oriented along a horizontal rather than a vertical axis. In these versions of the invention, the hinge would then allow the door to move upward or downward relative to the door opening.

Therefore, it is the object of the appended claims to cover all such variations and modifications as come within the true spirit and scope of the invention.

The embodiments of the invention, in which an exclusive property or privilege is claimed, are defined as follows:

1. A translating motion hinge assembly for connecting an aircraft door to a fuselage wherein, the door is adapted to be seated in a closed position in a door opening formed in the fuselage, the hinge assembly comprising:
   a hinge fitting having first and second opposed ends, said hinge fitting first end being pivotally attached to the aircraft fuselage adjacent the door opening and said hinge fitting being positioned so that when said door is in the closed position, said hinge fitting is spaced from the door opening;
   a universal shaft rotatably attached to said hinge fitting second end, said universal shaft including at least one linkage element for connecting the door to said universal shaft so that the aircraft door pivots around said second end of said hinge fitting in unison with the rotation of said shaft;
   a first fixed sprocket attached to the aircraft fuselage adjacent the location said hinge fitting is attached to the fuselage and a second sprocket mounted for rotation to said universal shaft, and
   a drive belt assembly including an open-ended rubber belt, said rubber belt having a pair of opposed ends, and an adjustable tensioner for connecting said ends of said drive belt wherein, said rubber belt is coupled to said sprockets so that when said hinge fitting is moved from the door closed position to a door open position, said drive belt causes said universal shaft to rotate so as to maintain the door in a substantially parallel orientation relative to the fuselage opening.

2. The hinge assembly of claim 1, wherein said hinge fitting is formed of at least two sections that are angularly offset from each other so that the door is moved from the door closed position to the door open position said hinge fitting is pivoted through the door opening and the door is laterally offset from the door opening.

3. The hinge assembly of claim 2, further including at least two linkage elements for connecting the aircraft door to said universal shaft, said linkage elements being pivotally connected to said universal shaft so that the door can move vertically relative to said hinge fitting.

4. The hinge assembly of claim 1, further including a pair of idler sprockets rotatably attached to said hinge fitting wherein said rubber belt is partially wrapped about each said idler sprocket.

5. The hinge assembly of claim 2, further including a pair of idler sprockets rotatably attached to said hinge fitting wherein said idler sprockets are positioned at a location where said hinge fitting sections meet and said rubber belt is partially wrapped about each said idler sprocket.

6. The hinge assembly of claim 2, wherein said shoulder section and said outboard section of said hinge fitting are axially offset by approximately 45°.

7. The hinge assembly of claim 1, further including a snubber assembly attached between said universal shaft and said hinge fitting so as to slow the motion of said hinge fitting when said hinge fitting is moved from the door closed position to the door open position.

8. The hinge assembly of claim 1, wherein said fixed sprocket is rotatably attached to said hinge fitting and further including an anchor assembly connected between said fuselage and said fixed sprocket for preventing rotation of said sprocket.

9. A translating motion hinge assembly for connecting an aircraft door to a fuselage, wherein the door is adapted to be seated in a closed position in a door opening formed in the fuselage, comprising:

a hinge fitting having a shoulder section adjacent the fuselage and an outboard section connected to said shoulder section, said shoulder section being pivotally attached to the fuselage, said outboard section having a free end distal from said shoulder section wherein, said shoulder section and said outboard section are axially offset from each other so that when the aircraft door is in an open position, the aircraft door is laterally spaced from the door opening and said shoulder section and said outboard section are axially offset by less than 90°;

a universal shaft rotatably attached to said free end of said hinge fitting outboard section wherein, said universal shaft includes at least one linkage element for connecting the door to said universal shaft so that the aircraft door pivots around said free end of said hinge fitting outboard section in unison with the rotation of said shaft;

a pulley assembly including a fixed pulley secured to the aircraft fuselage adjacent the location said hinge fitting is attached to the aircraft fuselage, a rotating pulley attached to said universal shaft to rotate in unison therewith, and a twin-spindle idler pulley rotatably mounted to said hinge assembly at a location approximately where said shoulder section in said outboard section of said hinge fitting meet; and a drive belt in the form of a closed loop cable wrapped at a first end around said fixed pulley, at a second end around said rotating pulley, and wrapped at separate locations around said idler pulley so that the opposed sections of said cable are disposed over separate ones of said idler pulleys so that when said hinge fitting is moved from the door closed position to the door open position, said drive belt causes said universal shaft to rotate so as to maintain the door in a substantially parallel orientation relative to the fuselage door opening.

10. The hinge assembly of claim 9, further including a snubber assembly attached between said universal shaft and said hinge fitting so as to slow the motion of said hinge fitting when said hinge fitting is moved from the door closed position to the door open position.

11. The hinge assembly of claim 9, wherein said idler pulley is adjustably mounted to said hinge fitting.

12. The hinge assembly of claim 9, wherein said shoulder section and said outboard section of said hinge hitting are axially offset from each other by approximately 45°.

13. The hinge assembly of claim 9, further including at least two linkage elements for connecting the aircraft door to said universal shaft, said linkage elements being pivotally connected to said universal shaft so that the door can move vertically relative to said hinge fitting.

14. A hinge assembly connecting a translating motion-type aircraft door to an aircraft fuselage wherein, the door is dimensioned to be seated in an opening formed in the fuselage, the fuselage including a plurality of stops preventing the outward movement of the door, the door including a latch-lock mechanism for selectively lifting the door above the fuselage stops, said hinge assembly comprising:

a hinge fitting having a pair of opposed ends, said hinge fitting having a first end pivotally attached to the aircraft fuselage adjacent the door opening and a second end distal from the aircraft fuselage, said hinge fitting being positioned so that, when said door is seated in the door opening, said hinge fitting is spaced from the door opening;

a universal shaft rotatably attached to said second end of said hinge fitting;

at least two linkage elements, said linkage elements being connected to said universal shaft at spaced-apart locations, said linkage elements being pivotally connected to said universal shaft and the aircraft door to allow the aircraft door to vertically shift position relative to said hinge fitting and move about the fuselage stops so that the aircraft door rotates around said second end of said hinge fitting in unison with the rotation of said shaft;

a first fixed sprocket attached to the aircraft fuselage adjacent the location said hinge fitting is attached thereto and a second sprocket mounted on said universal shaft for rotation in unison with said shaft; and a drive belt assembly including an open-ended rubber belt, said rubber belt having teeth adapted to interlock with said sprockets and a pair of opposed ends, and an adjustable tensioner for connecting said ends of said rubber belt wherein, said rubber belt is coupled to said sprockets so as to cause said universal shaft to rotate so as to maintain the aircraft door in a substantially parallel orientation relative to the door opening and said drive belt assembly is separate from the aircraft door latch-lock assembly.

15. The hinge assembly of claim 14, wherein said hinge fitting is formed from at least two sections that are angularly offset from each other and said hinge fitting is attached to said aircraft fuselage so that said hinge fitting can be pivoted through the door opening, and so that when the door is moved to an open position, the door is laterally offset from the door opening.

16. The hinge assembly of claim 15, wherein said shoulder section and said outboard section of said hinge fitting are axially offset by approximately 45°.

17. The hinge assembly of claim 14, further including a pair of idler sprockets rotatably attached to said hinge fitting on opposite sides of said fitting whereby said rubber belt is wrapped partially around each said idler sprocket.

18. The hinge assembly of claim 14, further including a snubber assembly attached between said universal shaft and said hinge fitting so as to slow the motion of said hinge fitting when said hinge fitting is moved from the door closed position to the door open position.

19. The hinge assembly of claim 14, wherein said fixed sprocket is rotatably attached to said hinge fitting and further including an anchor assembly connected between said fuselage and said fixed sprocket for preventing rotation of said fixed sprocket.

* * * * *